(12) United States Patent
Pucker et al.

(10) Patent No.: US 12,515,804 B2
(45) Date of Patent: Jan. 6, 2026

(54) CART COMPARTMENT COOLING USING AIRCRAFT POTABLE WATER

(71) Applicant: The Boeing Company, Arlington, VA (US)

(72) Inventors: Andrew L. Pucker, Huntington Beach, CA (US); Thomas Joseph Moran, Lake Stevens, WA (US); Sami Movsesian, Glendale, CA (US)

(73) Assignee: THE BOEING COMPANY, Arlington, VA (US)

( * ) Notice: Subject to any disclaimer, the term of this patent is extended or adjusted under 35 U.S.C. 154(b) by 101 days.

(21) Appl. No.: 18/484,846

(22) Filed: Oct. 11, 2023

(65) Prior Publication Data

US 2025/0121942 A1 Apr. 17, 2025

(51) Int. Cl.
*F28D 15/00* (2006.01)
*B64D 11/04* (2006.01)
*B64D 13/06* (2006.01)

(52) U.S. Cl.
CPC .............. *B64D 13/06* (2013.01); *B64D 11/04* (2013.01); *B64D 2013/0629* (2013.01)

(58) Field of Classification Search
CPC . B64D 13/06; B64D 11/04; B64D 2013/0629
USPC ...................................................... 165/104.9
See application file for complete search history.

(56) References Cited

U.S. PATENT DOCUMENTS

| 10,488,075 B2 | 11/2019 | Burd |
| 2005/0210910 A1* | 9/2005 | Rigney ............. B60H 1/00014 |
| | | 62/506 |
| 2008/0087039 A1 | 4/2008 | Reed et al. |
| 2015/0089970 A1* | 4/2015 | Lu ........................ F25D 17/067 |
| | | 62/419 |
| 2016/0007736 A1* | 1/2016 | Burd ..................... A47B 31/06 |
| | | 62/411 |

FOREIGN PATENT DOCUMENTS

| CA | 2914818 A1 | 12/2014 |
| DE | 102005063407 B4 | 4/2013 |
| WO | 2008008324 A2 | 1/2008 |

OTHER PUBLICATIONS

EP Search Report mailed May 28, 2025 in re EP Application No. 25154204.9.
EP Search Report mailed Jun. 25, 2025 in re EP Application No. 25154203.1.

* cited by examiner

*Primary Examiner* — Davis D Hwu
(74) *Attorney, Agent, or Firm* — COATS & BENNETT, PLLC

(57) ABSTRACT

Systems and methods for cooling an aircraft galley cart compartment by providing cooling from a potable water flow circuit directed from an aircraft potable water supply to provide direct and indirect cooling are disclosed.

22 Claims, 13 Drawing Sheets

CART COMPARTMENT COOLING USING AIRCRAFT POTABLE WATER

TECHNOLOGICAL FIELD

The present disclosure relates, generally, to the field of refrigeration on aircraft. More specifically, the present disclosure relates to the field of cooling and/or chilling galley carts on passenger aircraft.

BACKGROUND

Air chillers are typically added into passenger aircraft architecture to maintain a cooled or chilled temperature of food cart contents. Such aircraft architecture has typically required the installation of air duct components and air chiller components into existing aircraft architecture. Such added components consequently add weight, increase noise, increase power consumption, and add system complexity to aircraft. The addition of weight to aircraft can commensurately increase fuel consumption, decrease aircraft range, potentially decrease passenger capacity count, and otherwise increase aircraft operation cost.

Unless explicitly identified as such, no statement herein is admitted as prior art merely by its inclusion in the Technological Field and/or Background section.

SUMMARY

A present aspect is directed to a system for cooling an aircraft galley cart compartment, with the system including a potable water flow from an aircraft potable water supply configured to circulate in a cool potable water circuit. The system further includes a potable water circuit in communication with the aircraft potable water supply, and an aircraft galley cart compartment configured to be at least partially cooled by a potable water flow circulated through the potable water circuit by at least one of direct potable water flow cooling and indirect potable water flow cooling.

In another aspect, the potable water flow is maintained in the potable water circuit at a temperature ranging from about 35° F. to about 77° F.

In another aspect, the aircraft galley cart compartment is configured to be at least partially cooled by a potable water flow through a potable water circuit circulated through the aircraft galley cart compartment to maintain the aircraft galley cart compartment at a temperature ranging from about 32° F. to about 45° F.

In another aspect, the system further includes a chilled air circuit, wherein at least a portion of the chilled air circuit is in communication with the aircraft galley cart compartment.

In another aspect, the system further includes a heat exchanger in communication with the potable water circuit.

In another aspect, the system further includes a water cooling component in communication with the potable water circuit, wherein said potable water circuit is exclusively responsible for cooling the aircraft galley cart compartment.

In another aspect, in operation, the potable water circuit is a closed potable water circuit, with the potable water closed circuit further including a valve, with the valve positioned between the aircraft potable water supply and the potable water circuit, and wherein the valve is configured to move from an open position to a closed position to maintain a closed initial potable water charge within the closed potable water circuit.

In another aspect, in operation, the potable water circuit is an open potable water circuit in communication with a continuous circulating potable water flow directed from the aircraft potable water supply into the potable water circuit, with the continuous potable water flow further directed from the potable water circuit back into the aircraft potable water supply.

In another aspect, the potable water circuit is in direct contact with the aircraft galley cart compartment, with the potable water circuit configured to provide direct cooling from the potable water circuit to the aircraft galley compartment.

In a further aspect, the potable water circuit is in communication with a chilled air circuit, with the potable water circuit configured to augment cooling air in the chilled air circuit, and with the chilled air circuit in direct contact with the aircraft galley cart compartment.

In another aspect, the potable water circuit is in direct contact with the aircraft galley cart compartment, and the chilled air circuit is in direct contact with the aircraft galley cart compartment.

Another aspect is directed to an aircraft comprising a system for cooling an aircraft galley cart compartment, with the system including a potable water flow from an aircraft potable water supply with the potable water flow maintained within a potable water circuit at a temperature ranging from about 35° F. to about 77° F. The system further includes a potable water circuit in communication with the aircraft potable water supply, and an aircraft galley cart compartment configured to be cooled by a potable water flow circulated through the potable water circuit by at least one of direct cooling and indirect cooling.

A present method 200 is directed to cooling an aircraft galley cart compartment, with the method including directing a potable water flow of potable water in an aircraft from a potable water supply within a potable water circuit, with the potable water flow including a potable water temperature that is below an aircraft cabin ambient temperature. The method further includes positioning the potable water circuit in communication with at least one of a chilled air circuit and an aircraft galley cart compartment to cool an aircraft galley cart compartment at least one of directly or indirectly, and maintaining an aircraft galley cart compartment temperature at a temperature ranging from about 32° F. to about 45° F.

In another aspect, in operation, the potable water circuit includes a closed potable water circuit.

In another aspect, in operation, the potable water circuit includes an open potable water circuit configured to remain in open communication with the aircraft potable water supply.

In a further aspect, the closed potable water circuit further includes a heat exchanger in communication with the closed potable water circuit and the air circuit, with the closed potable water circuit directly contacting the aircraft galley cart compartment.

In another aspect, the closed potable water circuit further includes a potable water cooling component, with the closed potable water circuit directly contacting the aircraft galley cart compartment.

In another aspect, the open potable water circuit further includes a heat exchanger in communication with the open potable water circuit and the air circuit, with the open potable water circuit directly contacting the aircraft galley cart compartment.

In another aspect, the open potable water circuit further includes a water cooling system, with the open potable water circuit directly contacting the aircraft galley cart compartment.

In another aspect, the open potable water circuit further includes a heat exchanger in communication with the open potable water circuit and the air circuit.

In a further aspect, the potable water in the potable water circuit maintains a temperature ranging from about 35° F. to about 77° F.

In another aspect, a method 300 further comprises directing 302 chilled air from a chilled air circuit to the galley cart compartment.

In another aspect, a method 400 further includes, both directing 302 chilled air from a chilled air circuit to the galley cart compartment and directing 402 a cooled potable water flow from the potable water circuit to the aircraft galley cart compartment.

In another aspect, a method 500 further comprises directing 402 cooled potable water flow from the potable water circuit to the aircraft galley cart compartment, and wherein the cooled potable water flow from the potable water circuit is exclusively responsible for cooling the galley cart compartment.

Another present aspect is directed to an aircraft galley cart compartment cooled according to a method including directing a potable water flow of potable water in an aircraft from an aircraft potable water supply within a potable water circuit, with the potable water including a potable water temperature that is below an aircraft cabin ambient temperature. The method further includes positioning the potable water circuit in communication with at least one of a chilled air circuit and an aircraft galley cart compartment to cool an aircraft galley cart compartment at least one of directly or indirectly, and maintaining an aircraft galley cart compartment temperature at a temperature ranging from about 32° F. to about 45° F.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
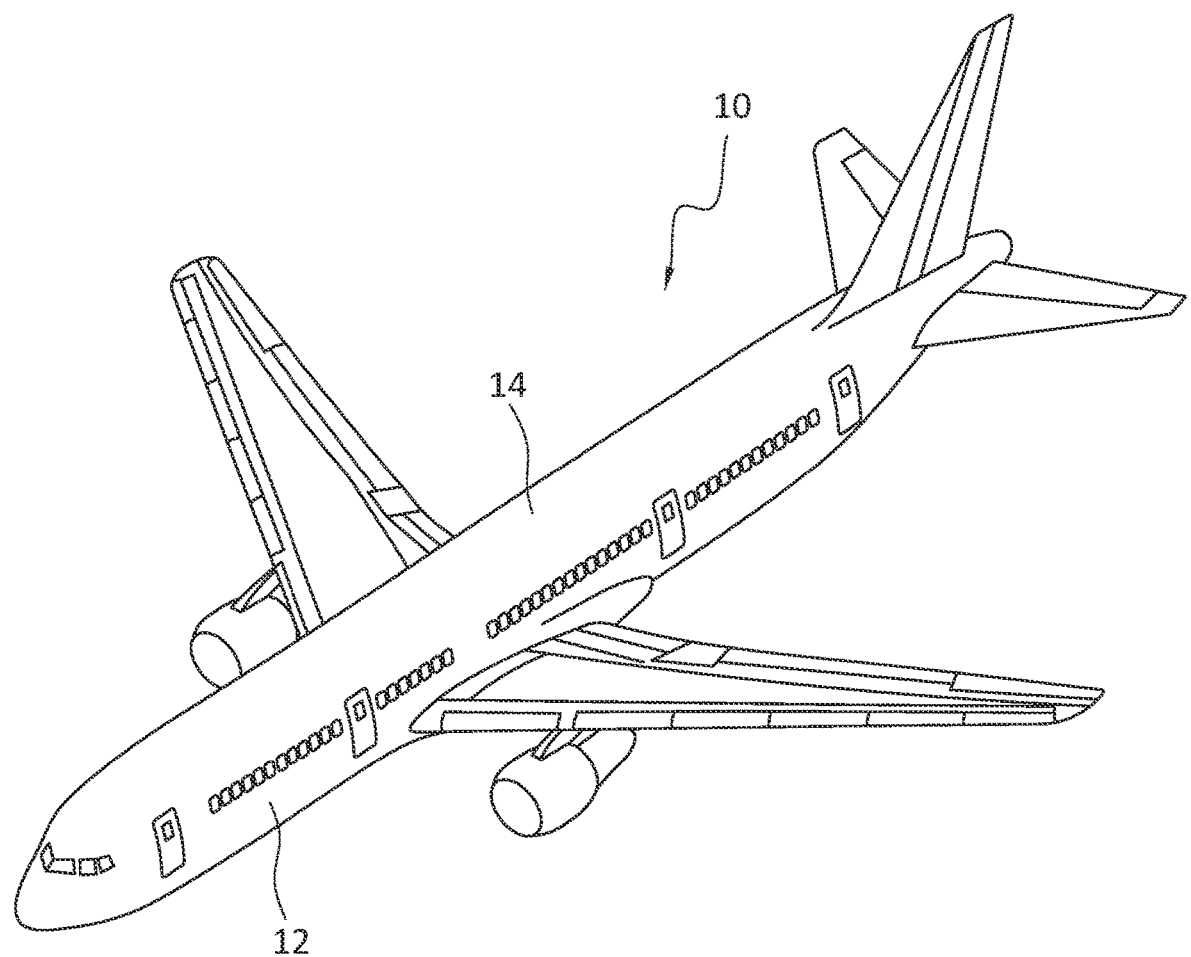
Figure 2:
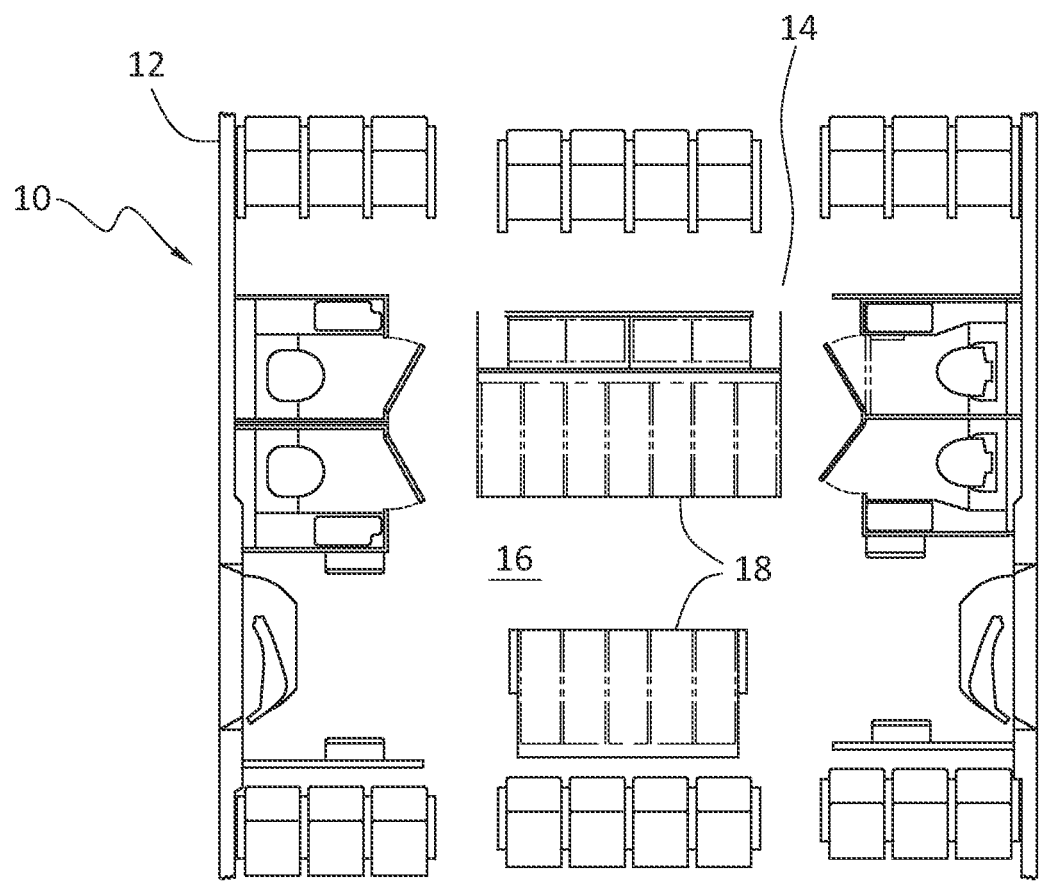
Figure 3:
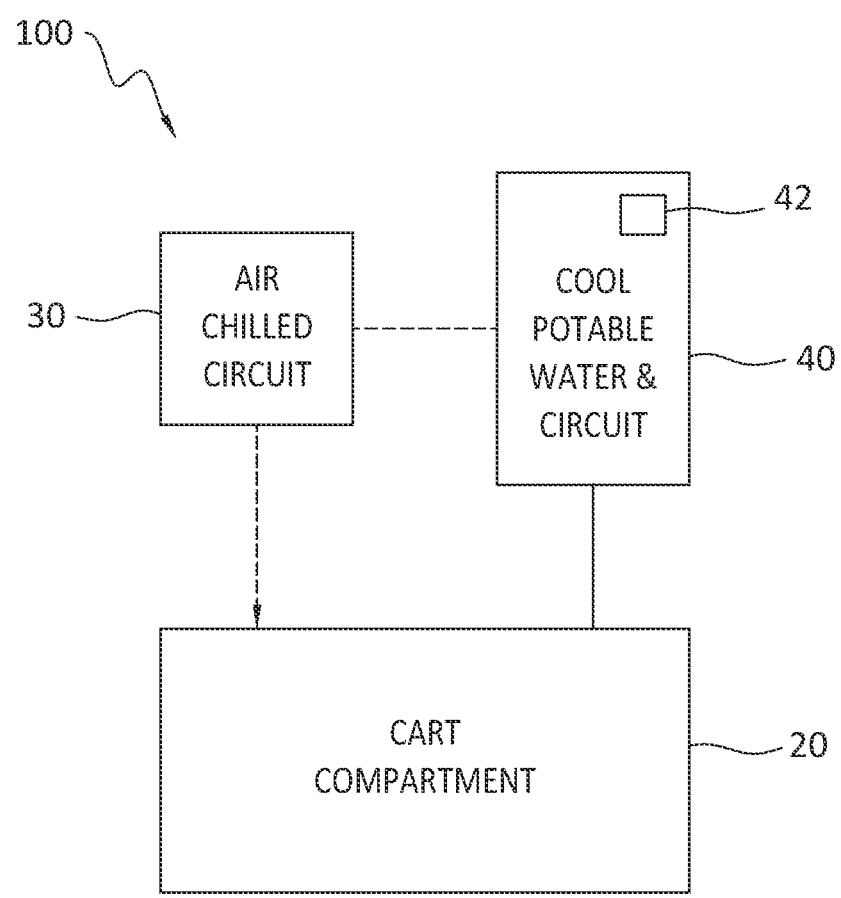
Figure 4:
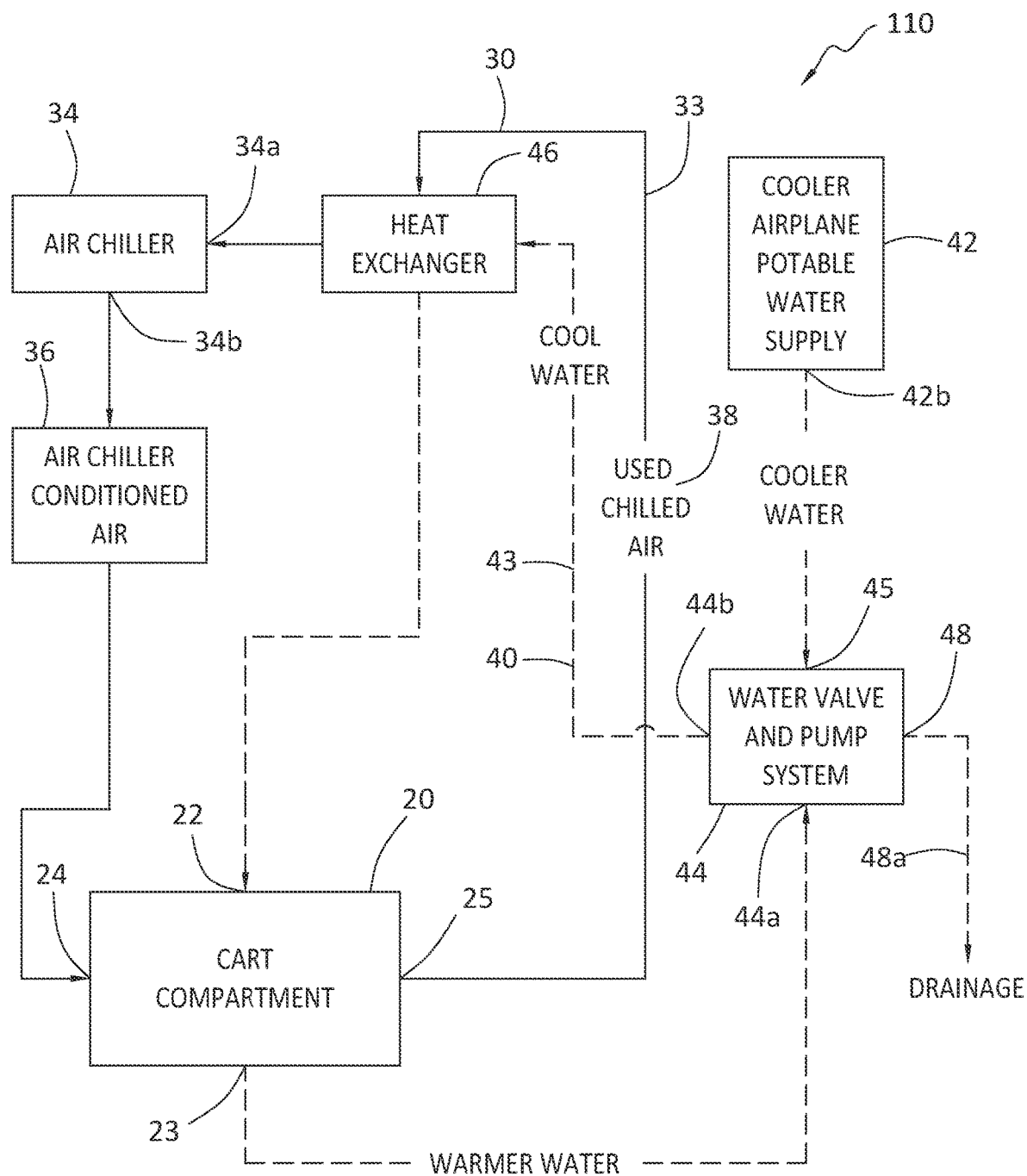
Figure 5:
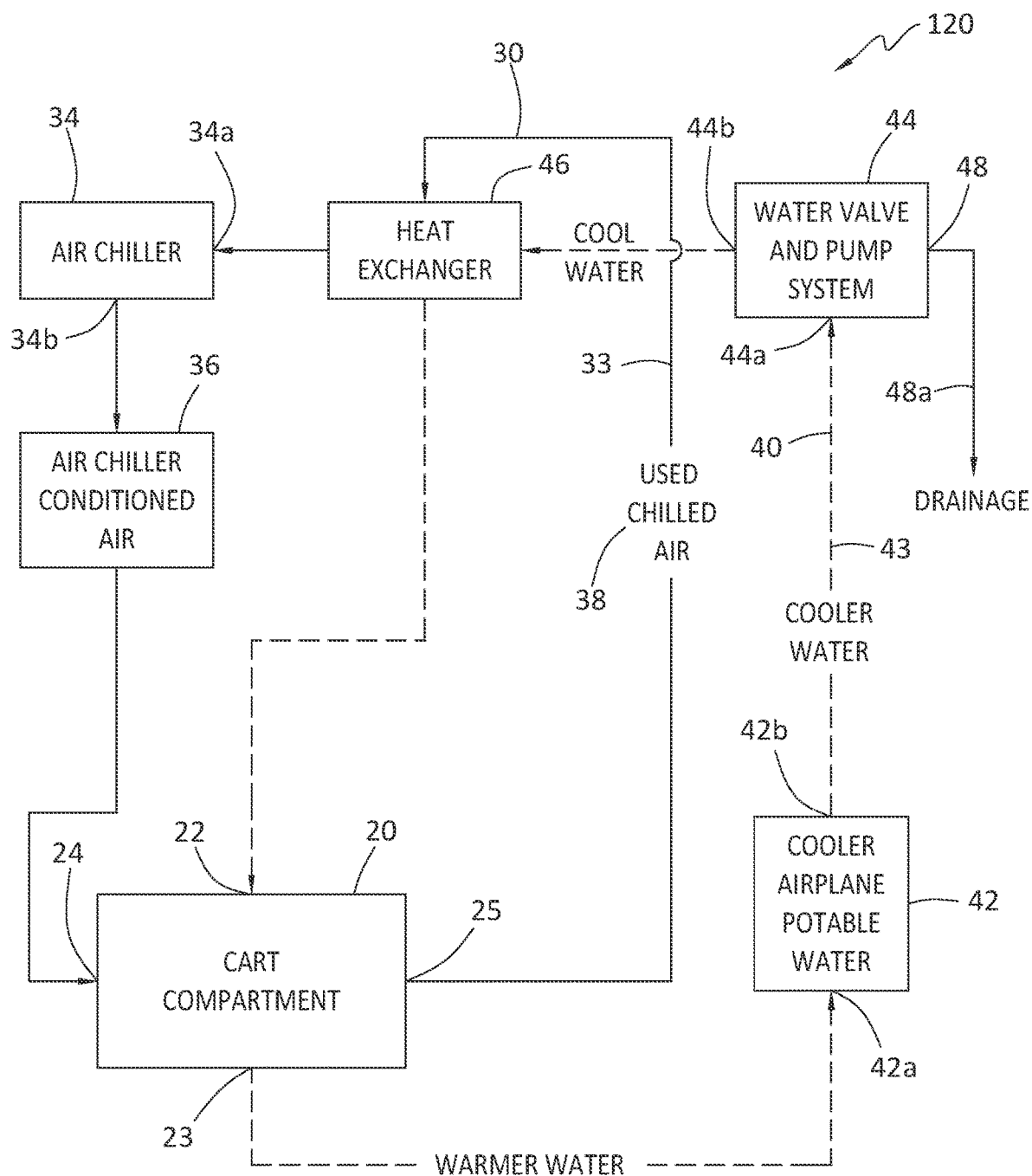
Figure 6:
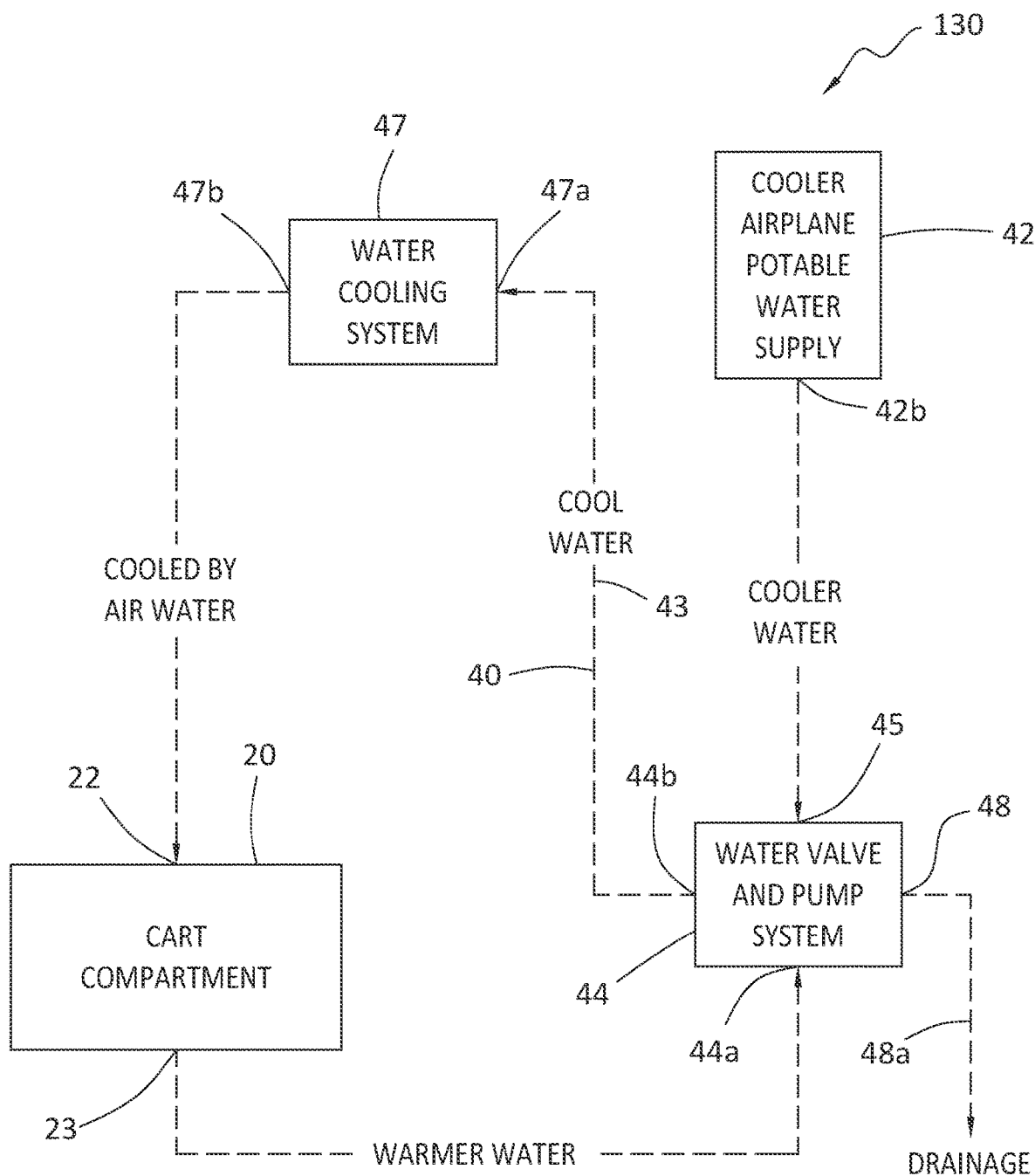
Figure 7:
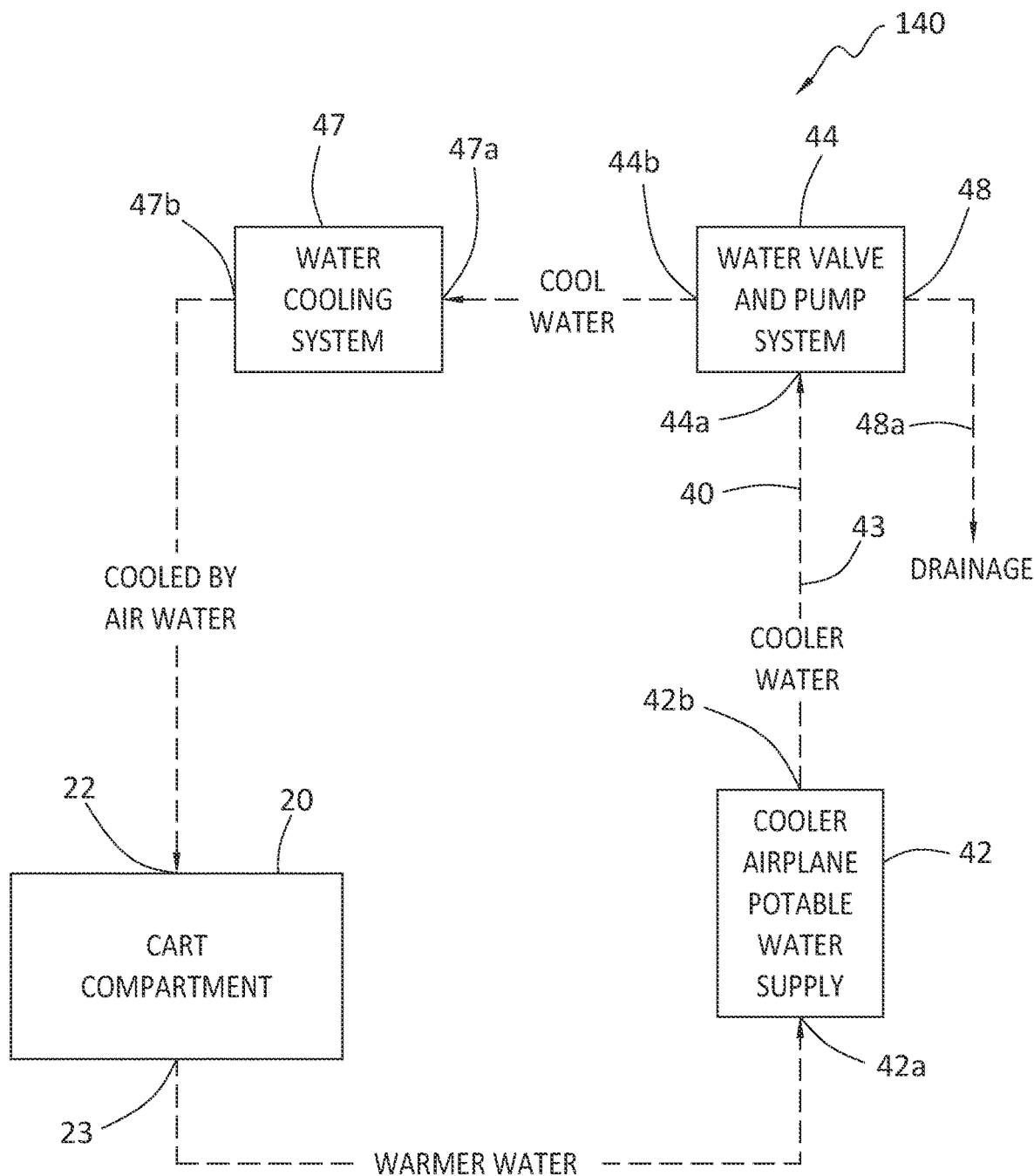
Figure 8:
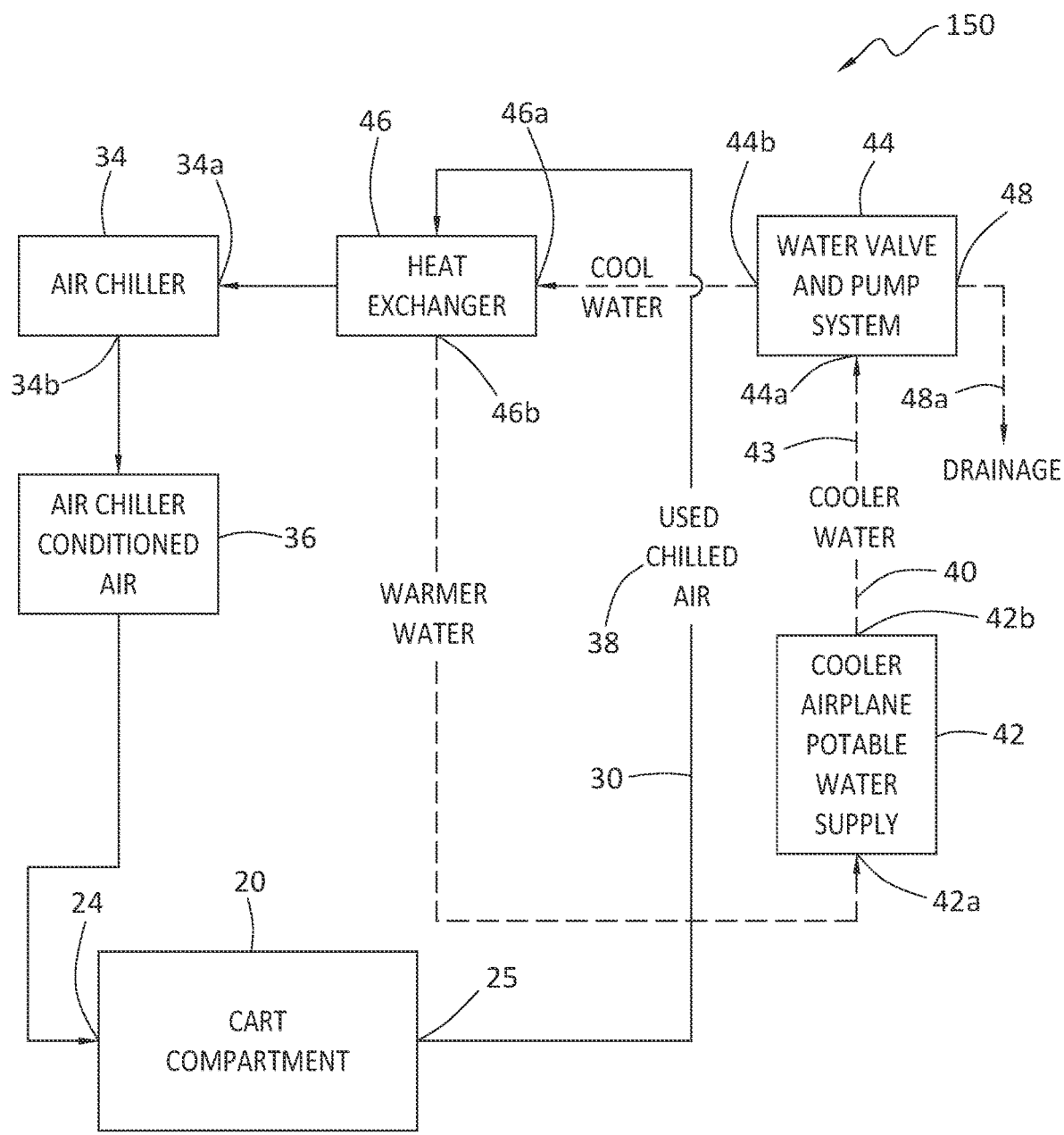
Figure 9:
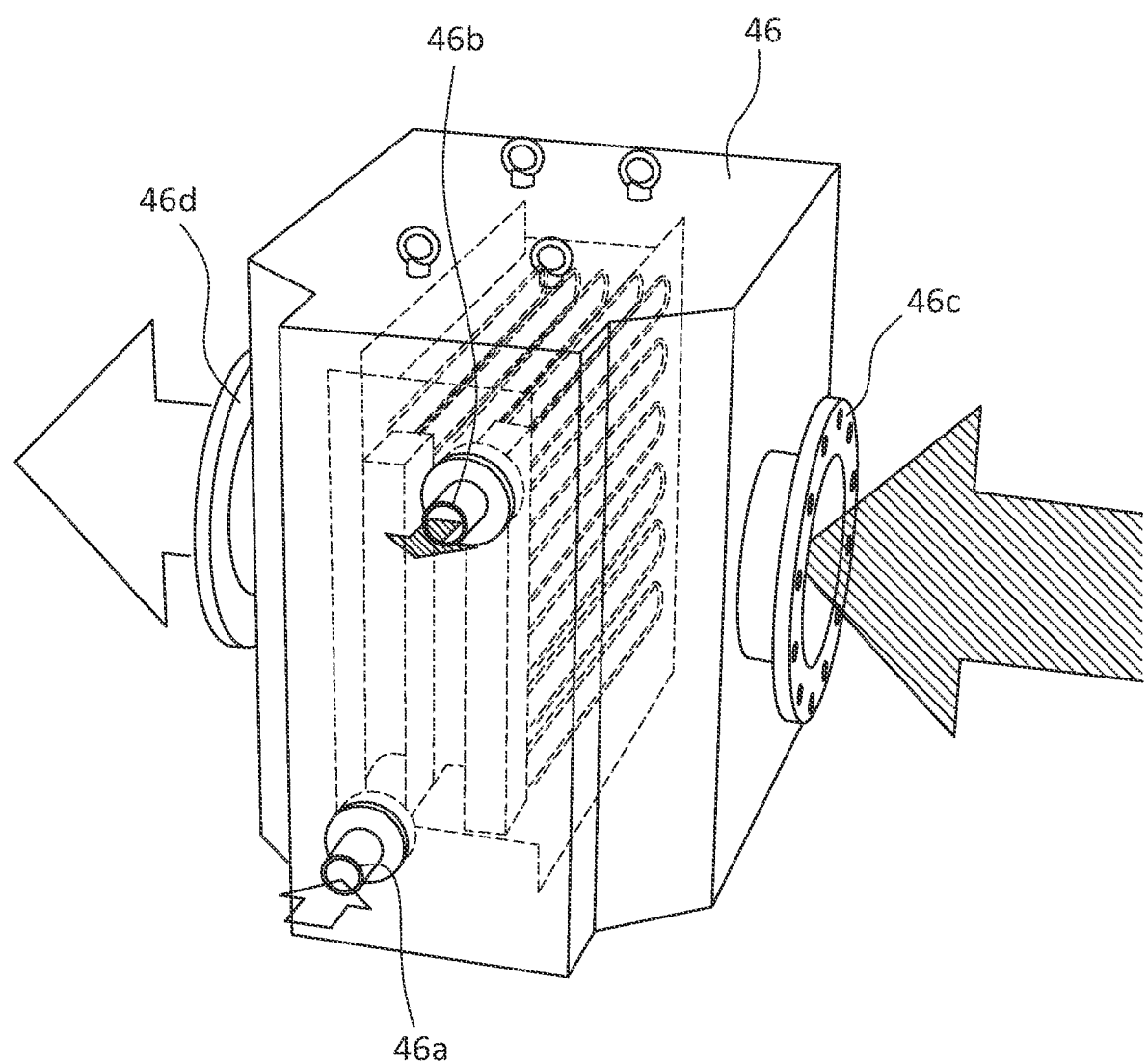
Figure 10:
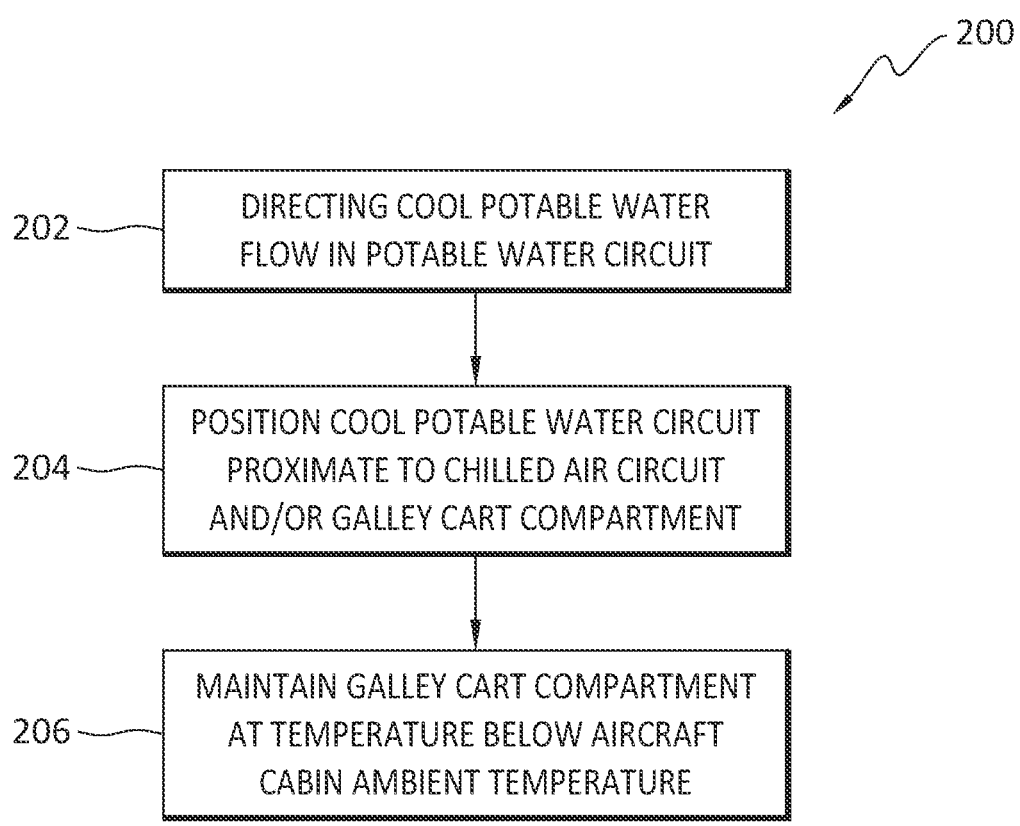
Figure 11:
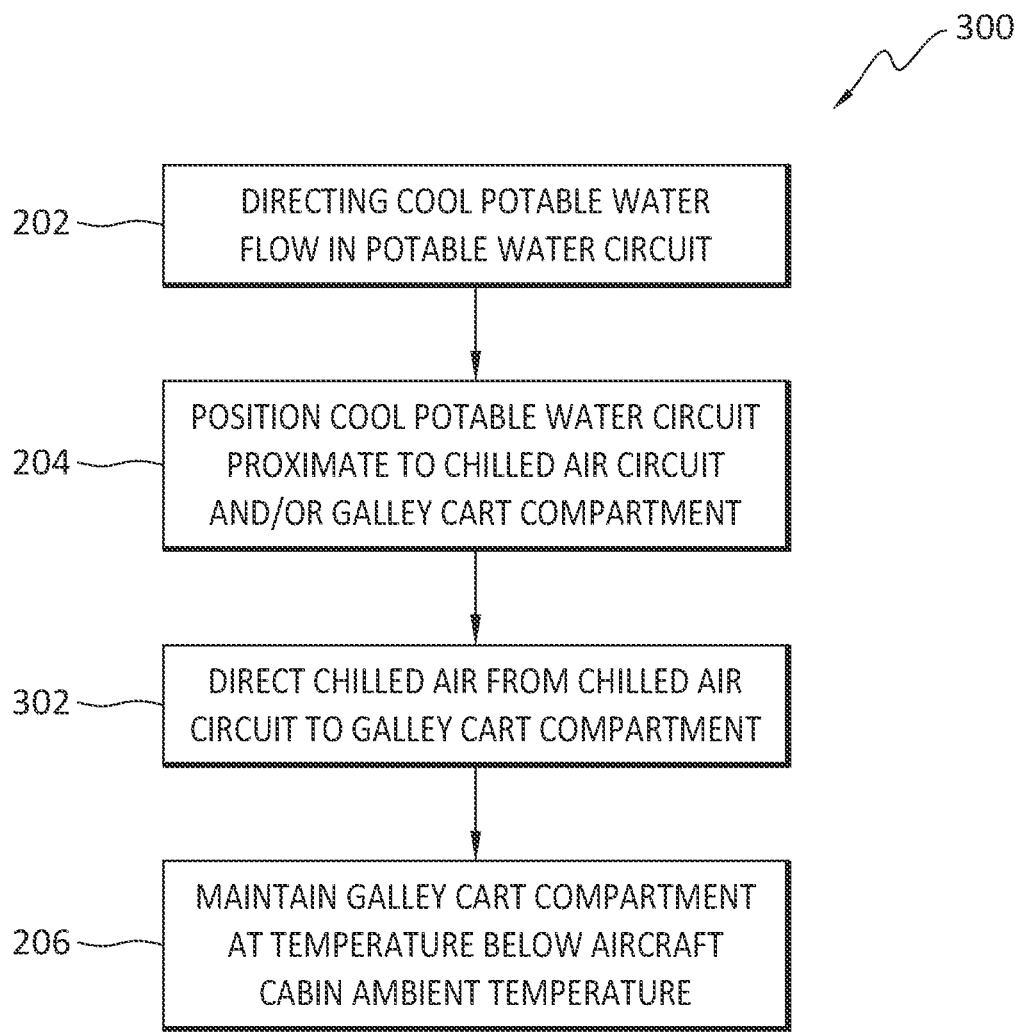
Figure 12:
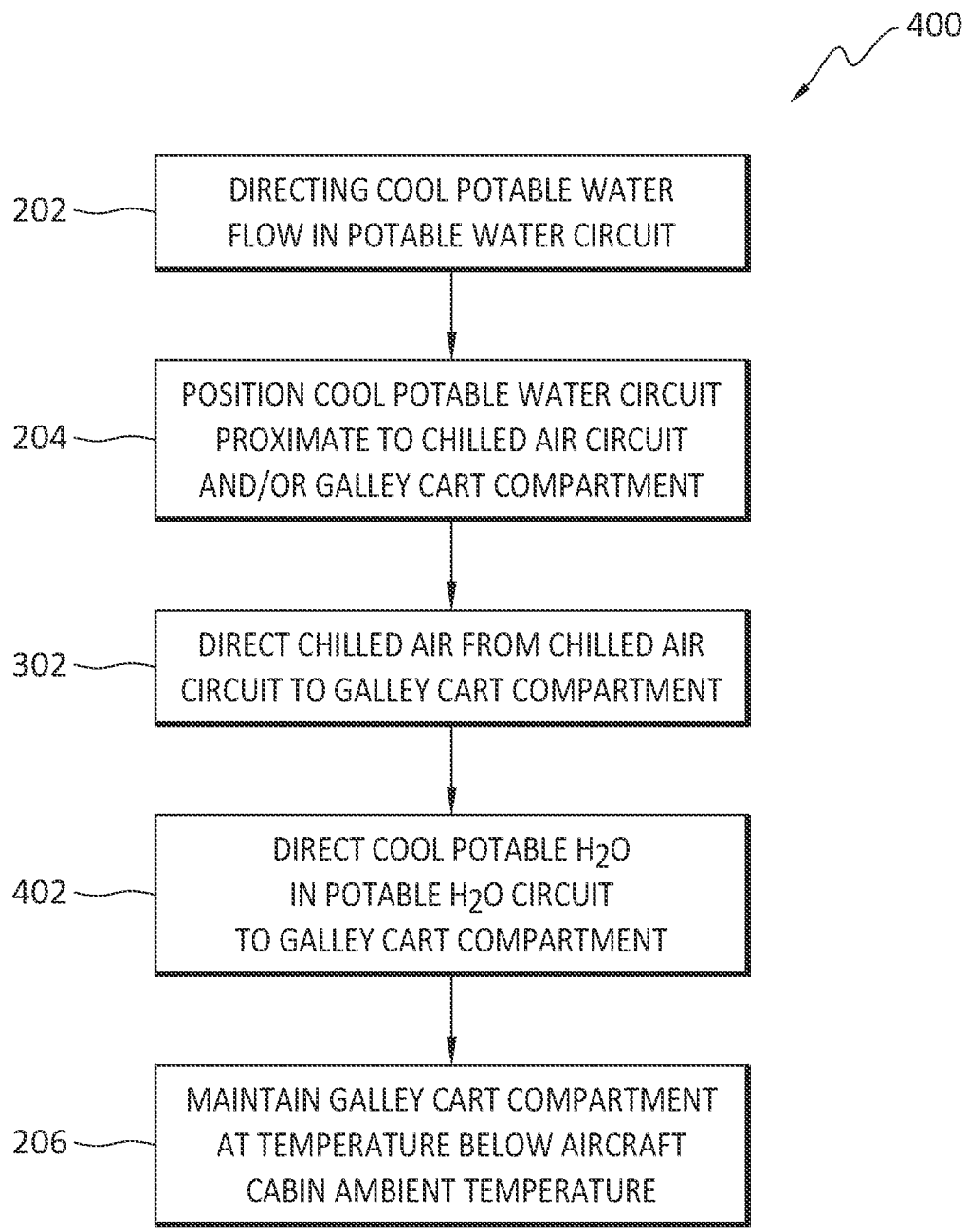

Having thus described variations of the disclosure in general terms, reference will now be made to the accompanying drawings, which are not necessarily drawn to scale, and wherein:

FIG. 1 is an illustration of a vehicle in the form of an aircraft, according to present aspects;

FIG. 2 is an overhead plan view of an aircraft cabin present in an aircraft of the type shown in FIG. 1, according to present aspects;

FIG. 3 is a box diagram of a potable water circuit, according to present aspects;

FIG. 4 is a box diagram of a closed potable water circuit, according to present aspects;

FIG. 5 is a box diagram of an open potable water circuit, according to present aspects;

FIG. 6 is a box diagram of a closed potable water circuit, according to present aspects;

FIG. 7 is a box diagram of an open potable water circuit, according to present aspects;

FIG. 8 is a box diagram of an open potable water circuit, according to present aspects;

FIG. 9 is perspective view of a heat exchanger, according to present aspects;

FIG. 10 is a flowchart outlining a method, according to present aspects;

FIG. 11 is a flowchart outlining a method, according to present aspects;

FIG. 12 is a flowchart outlining a method, according to present aspects; and

Figure 13:
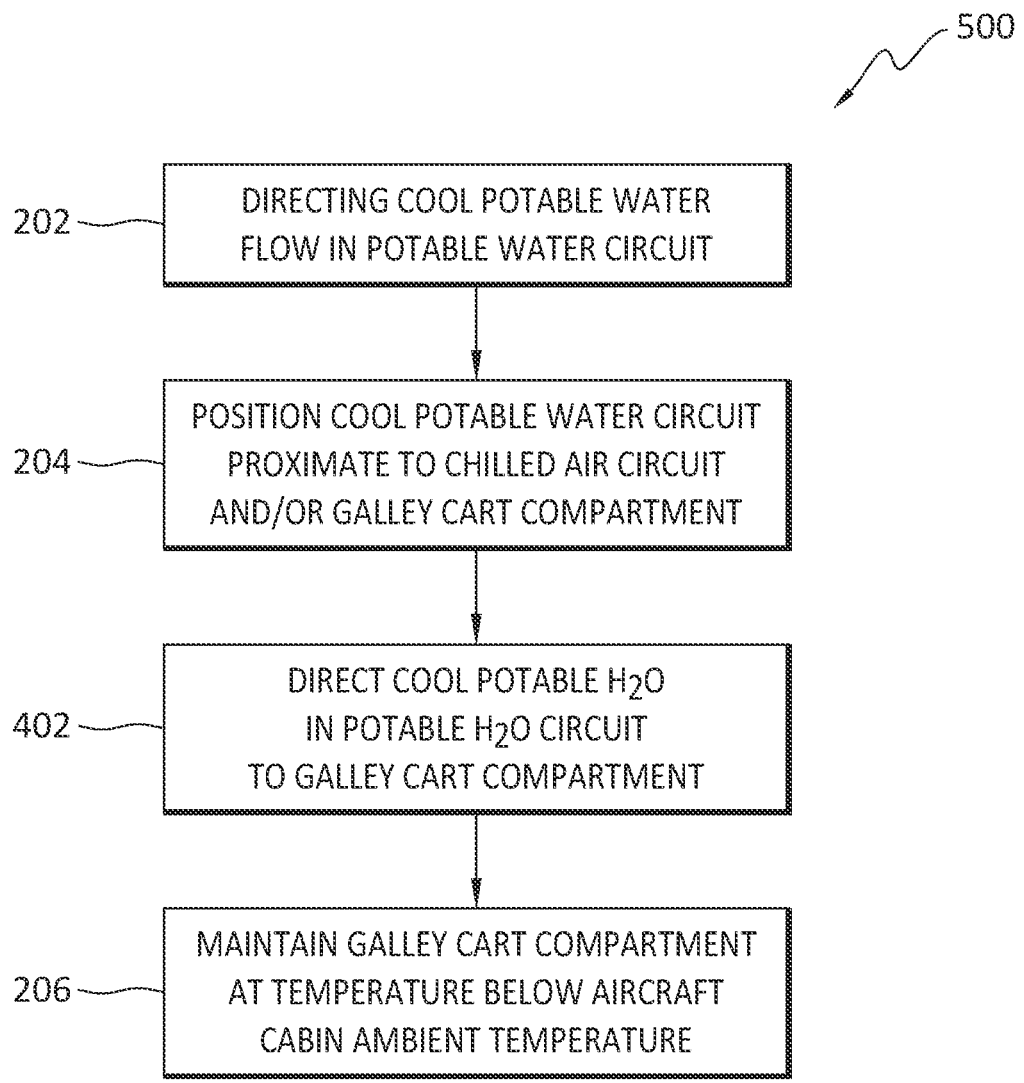

FIG. 13 is a flowchart outlining a method, according to present aspects.

DETAILED DESCRIPTION

Passenger aircraft typically use potable water directed from a potable water supply for multiple passenger and crew uses including, for example, lavatory needs (that can include toilet operation, hand washing, etc.), crew needs, for example, in a galley location, and other uses. Potable water is typically maintained within one or more potable water tanks typically stored in a cargo or equipment bay located beneath a passenger cabin floor, with the potable water tanks typically residing in an area of the aircraft that is typically subjected to cold temperatures when an aircraft is in a flight phase and flying at altitudes with cold temperatures located outside the aircraft.

Potable water tanks on aircraft (referred to equivalently herein as "an aircraft potable water supply") can include an intake and discharge port that can be the same port capable of providing intake function for filling the potable water tank(s), and a discharge function for depleting/draining the potable water tank(s). A potable water tank can be charged/filled when the aircraft is on the ground from a ground potable water supply that can be a direct ground water supply from a ground-based tank that is pumped into the aircraft potable water tank(s). In addition, a ground potable water tanker-type vehicle can transfer potable water, for example, from a ground water tank, into the aircraft potable water tank(s). In both instances, the potable water that is transferred into aircraft potable water tank(s) is typically delivered at a below-ambient temperature such that the potable water is in a "cooled temperature" ranging from about 35° F. to about 77° F.

Potable water temperature can increase in within the aircraft potable water tank(s) when an aircraft is on the ground (e.g., if the ambient outdoor temperature is warm with temperatures ranging from about 80° F. or more). However, once an aircraft is airborne and reaches an altitude, for example, in excess of about 10,000 feet, the ambient temperature outside of the aircraft during flight can reach cold ambient outdoor temperatures ranging from about minus 20° F. to about 0° F., etc. Accordingly, potable water typically enters an aircraft (e.g., is delivered from an exterior potable water source into an aircraft, etc.) at below ambient temperatures and, due to the location of potable water tanks on aircraft "below-deck" (e.g., in aircraft equipment and cargo bays that are not typically heated, etc.), an aircraft potable water supply in aircraft potable water tank(s) is typically directed from an aircraft potable water supply, in flight, to aircraft cabins at "cool" temperatures ranging from about 40° F. to 50° F.

In another example, an aircraft potable water supply in the form of a "tank" can be located in other aircraft locations also typically not heated including, for example, in an aircraft crown (e.g., located above an aircraft passenger cabin ceiling, etc.). In another example, an aircraft can comprise multiple potable water tanks located at the same or differing aircraft locations or regions (e.g., one or more potable water tanks located "below-deck" as well as one or more tanks located in the aircraft crown, etc.).

According to present aspects, potable water sources on an aircraft represent a source of cool material flow that presents a thermal delta between the potable water flow from a potable water source and points along a potable water flow circuit directed from a potable water supply in a in a potable water circuit. According to further present aspects, a potable water flow in an aircraft is configured to absorb heat during a thermal exchange occurring between a potable water flow "cooler" temperature and a higher ambient temperature that can be, for example, located at monuments within an aircraft passenger cabin.

Present aspects are directed to the efficient redirection, re-purposing, modification, and augmentation of a potable water flow of potable water from potable water systems already present in an aircraft into a new potable water circuit for the purpose of maintaining a below-ambient temperature of food cart/galley cart contents (e.g., at a galley cart compartment temperature ranging from about 32° F. to about 45° F. According to present aspects, the advantageous use of the thermal delta of the cool aircraft potable water supply, at least during flight, and cool potable water flow relative to and compared to warmer aircraft environments, that can include a galley cart compartment, can significantly decrease existing aircraft cooling system complexity, including, for example, decreasing aircraft power consumption, obviating or reducing the size of chillers, cooling units, chilling solutions (e.g., dry ice, ice, etc.), reducing the footprint, size characteristics, and power consumption demands of such cooling units, etc. The reduction and/or elimination of cooling equipment and power consumption demands, etc., can result in a significant reduction in the overall weight of an aircraft, resulting in significant decreases operating cost, and a significant increase in efficiency that can result in the increase in sustainability and decrease in an environmental footprint of an aircraft.

In addition, present aspects obviate the need to install and power separate equipment, components, and systems onto aircraft that perform the dedicated and primary function of refrigerating food cart contents in an aircraft, for example. In addition, present aspects employ a safe, modified cooling system that will also cool and/or chill aircraft food cart/galley cart contents, etc., and that will operate by directing already cool potable water to produce enhanced cooling of aircraft food cart/galley cart contents, etc., with present systems obviating the installation of separate dedicated cooling systems that can employ ammonia or other potentially toxic compounds.

FIG. 1 is a perspective view of a vehicle in the form of an aircraft 10 including a fuselage 12, and containing and otherwise including an aircraft cabin 14 within fuselage 12. FIG. 2 is an overhead plan view of the aircraft cabin 14 within an aircraft of the type shown in FIG. 1 as aircraft 10. FIG. 2 is an overhead view of an aircraft cabin 14 that can be of the type located within aircraft 10. As shown in FIG. 2, a galley region 16 can include a plurality of galley carts 18 located within galley region 16. While present aspects are directed to the enhanced direct or indirect cooling of galley cart compartments on aircraft through the direction of a cool, cold potable water circuit to a galley cart compartment, present aspects also contemplate the use of a cool potable water circuit to enhance cooling of areas that can require refrigeration, including galley areas that can, for example, house galley carts, as well as stationary refrigeration areas and compartments.

According to present aspects, a potable water circuit is established and configured within an aircraft, with the potable water circuit in communication with a cool aircraft potable water supply and/or further in communication with existing potable water circuits in aircraft. In one present aspect, a system for cooling an aircraft galley cart compartment includes directing a potable water flow within a potable water circuit in communication with a cool potable water supply. The potable water circuit is configured to transfer the cooling capability of the cool potable water flow directly, or indirectly, to a galley cart compartment. As defined herein, a "cool" aircraft potable water supply and a "cool" potable water flow refers to a temperature of the aircraft water supply and the potable water flow being at least cooler than an ambient temperature of an aircraft cabin when the aircraft is on the ground in a hot environment, and significantly cooler than an aircraft cabin ambient temperature when the aircraft is in flight and at a sustained altitude of greater than about 10,000 feet, for example.

FIG. 3 is a general system diagram, according to present aspects, showing a system 100, including a potable water circuit 40 (referred to equivalently herein as "cool potable water circuit 40" and/or "water circuit 40") in communication with an aircraft potable water supply 42 (that can be a cool potable water reservoir, a cool potable water tank, etc.). As shown in FIG. 3, the cool potable water circuit is in communication directly or indirectly with the galley cart compartment 20. FIG. 3 further shows potable water circuit 40 in communication with a chilled air circuit 30 ("referred to equivalently herein as "air circuit 30") that is further in communication with the galley cart compartment 20.

According to present aspects, the cooling transfer can be transferred indirectly to the galley cart compartment with the cool potable water flow interacting with an airflow to chill or to further chill air in the airflow that is then directed to the aircraft galley cart compartment. In this aspect, the cooling effect of the potable water flow in the potable water circuit can interface with an airflow at, and via, a heat exchanger to cool or chill the airflow that is then directed from the heat exchanger to the galley cart compartment. According to present aspects, the airflow chilled by the potable water flow within the potable water circuit can further be in communication with an auxiliary air cooler or air chiller, with the size and/or footprint of the auxiliary air chiller able to be significantly reduced compared with air chillers that were previously used.

In another example, and according to present aspects, a galley cart compartment can be cooled by both: 1) directing a cool potable water flow through a potable water circuit that directly contacts a galley cart compartment, with a thermal delta between the cooler potable water flow temperature as compared to a warmer temperature within a galley cart compartment; and 2) also directing a chilled airflow from a heat exchanger to the galley cart compartment; with the cool potable water flow in the potable water circuit directed to the heat exchanger to chill or further chill an airflow at the heat exchanger.

In another example, and according to present aspects, the cooling effect from a cool potable water circuit is directed to cool an aircraft galley cart compartment exclusively. That is, according to a present aspect, a cool potable water circuit is solely responsible for cooling a galley cart compartment with no cooling contribution from a co-directed cooling airflow.

FIGS. 4, 5, 6, 7, and 8 are circuit illustrations outlining, more specifically, present aspects. FIGS. 4, 5, and 8, illustrate present aspects where both a chilled air circuit and a cool potable water circuit are present and can work together to cool a galley cart compartment. According to present aspects, the presence of the cool potable water circuit enables the use of smaller components in the chilled air circuit, or the ability to completely obviate the presence of certain dedicated air-chilling components in the air circuit that were previously used to deliver cool air to the galley cart compartment. Present aspects also result in the production of significantly less noise from the air cooling system as well as a significant reduction in the power drain (referred to equivalently herein as "power consumption" and "power demand") previously realized by typical air cooling systems. According to present aspects, as shown in FIGS. 4, 5, and 8, the cool potable water circuit is at least partially responsible for also cooling the airflow that in turn cools the galley cart compartment.

In FIGS. 6 and 7, according to present aspects, the use of the cool potable water circuit can be exclusively responsible for cooling the galley cart compartment, as the circuits presented in FIGS. 6 and 7 do not include a cool air circuit. That is, as explained herein, FIGS. 6 and 7 present a system for cooling galley cart compartments that only includes the cool potable water circuit.

In addition, present aspects include a cool potable water circuit implemented to cool a galley cart compartment where the cool potable water circuit is either "closed" or "open". That is, in FIGS. 4 and 6, the cool potable water from the cool aircraft potable water supply is directed into the cool potable water circuit (that is referred to herein as being a "closed" circuit); as an initial charge of cool potable water from the aircraft potable water supply fills the cool potable water circuit, and after which a valve is engaged at the cool potable water supply outlet to cease a flow into the circuit from the cool potable water supply. In this "closed" cool potable water circuit, the cool potable water within the circuit can increase slightly in temperature during water movement through the circuit, and as the cool water engages heat sinks in the circuit, including the galley cart compartment requiring cooling from the cool potable water, a heat exchanger, etc.

As explained herein, according to present aspects, the temperature of the potable water in the circuit can be cooled environmentally by, for example, adjusting amounts and types of insulation present at the aircraft potable water supply and throughout the potable water circuit that is exposed to cold ambient temperatures outside of an aircraft during flight. In addition, according to present aspects, the temperature of the potable water in the circuit can be additionally cooled by incorporating a small water chiller in the potable water circuit to continually cool the potable water and otherwise maintain a selected cool temperature in the potable water circuit, for example, maintaining the cool potable water in the potable water circuit at a temperature ranging from about 32° F. to about 45° F. during flight; with the cool potable water temperature that contacts components of the galley cart compartment maintaining a temperature ranging from about 32° F. to about 45° F.

In FIGS. 5, 6, and 8, the cool potable water from the cool aircraft potable water supply is continually directed into the cool potable water circuit (that is referred to herein as an "open" circuit) as an initial charge of cool potable water fills the cool potable water circuit, after which potable water is returned to the cool potable water supply at a cool potable water circuit "return", with the cool potable water supply outlet into the circuit remaining "open" to deliver a continuous ("fresh") supply of cool potable water to the circuit from the cool aircraft potable water supply. Again, according to present aspects, potable water flowing through the potable water circuit returns into the aircraft potable water supply in the open circuit. In the "open" circuit configuration, the temperature of the cool potable water can more likely not realize a significant rise in temperature during flight as, in the open circuit configuration, a continuous fresh supply of low temperature potable water (e.g., cool or cold potable water) enters the cool potable water circuit from the cool aircraft potable water supply, and obviating the presence or need for a water chiller in communication with the potable water circuit.

FIG. 4 is a diagram showing a system 110 that includes both a cool potable water circuit 40 in a "closed" circuit configuration (shown as a "dashed" line) and a chilled air circuit 30 (shown as a solid line), with both the chilled air circuit 30 and the "closed" cool potable water circuit 40 in direct communication with a galley cart compartment 20. As shown in FIG. 4, a cool aircraft potable water supply 42 (referred to equivalently herein as "aircraft potable water supply 42") that can be, for example, an aircraft potable water tank (having a capacity of several hundred gallons of potable water, or more) that contains cool potable water that can have an average temperature of cool potable water pumped into the tank while the aircraft is on the ground ranging from about 35° F. to about 77° F. During flight, with the cool potable water supply 42 can be located in partially insulated areas of the aircraft that have more exposure to cold temperatures outside of the aircraft (as opposed to the conditioned environment in a passenger cabin, for example) to keep the potable water cool or cold in the potable water supply; and maintaining an average temperature of the cool potable water in the cool potable water supply ranging from about 35° F. to about 45° F., for example.

While the present FIGs. illustrate systems that comprise "open" and/or "closed" potable water circuits, additional present aspects contemplate the ability to increase system versatility, efficiency, and energy conservation by comprising the architecture (control features, including valving, switching, signaling, processing, etc., necessary to convert or "switch" an illustrated system between open and closed configurations on the ground and/or in flight.

FIG. 4 further shows cool potable water directed from the cool aircraft potable water supply 42 via the potable water supply outlet 42*b* into potable water circuit line 43 of cool potable water circuit 40 with the cool potable water directed toward pump inlet 44*a* of pump 44. Pump 44 further includes valve 45 configured into an open position to allow passage of water into potable water line 43 only during an initial charging of the cool potable water circuit 40, after which valve 45 is "shut" or "closed" to block a flow of cool potable water from the potable water circuit 40 back into the cool aircraft potable water supply 42, and establishing a "closed" cool potable water circuit 40. Pump 44 directs cool potable water flow into potable water circuit 40 toward heat exchanger 46 positioned proximate to an air chiller 34 in a chilled air circuit 30. Cool potable water passing through heat exchanger (heat exchanger shown in more detail in FIG. 9, herein) encounters a temperature gradient that slightly warms the cool potable water and, in turn, lowers the temperature of an airflow passing through heat exchanger 46, with the potable water leaving the heat exchanger still considered to be "cool" and maintaining an average potable water flow temperature ranging from about 40° F. to about 50° F. at that point in the cool potable water circuit 40.

The cool potable water is then directed to the galley cart compartment 20 via the cart compartment cool potable water inlet 22 to cool the galley cart compartment, with a "slightly warmer" cool potable water flow in the potable water circuit leaving the galley cart compartment (indicated in FIG. 4 system 110 as used "warmer water") via cart compartment cool potable water outlet 23 and circulating within the potable water circuit 40 back to pump inlet 44*a* of pump 44, and through pump outlet 44*b* and proceeding back into the cool potable water circuit 40. As the "slightly warmer" cool potable water leaves the galley cart compartment, the potable water will begin to chill as the cool potable water circuit that is located beneath the aircraft cabin (and that is exposed to lower ambient temperatures beneath the passenger cabin will begin to chill as the potable water flow proceeds to and from the pump to the heat exchanger, and through the potable water circuit 40 again.

FIG. 4 further shows the chilled air circuit 30 that also directly helps to cool the galley cart compartment according to present system 110, with airflow present in and adjacent to the heat exchanger 46 cooled by the cool potable water flowing to and through the heat exchanger 46, with the cooler air directed from the heat exchanger to air chiller 34 (via air chiller inlet 34*a* and air chiller outlet 34*b*) and into and out from the galley cart compartment 20 via galley cart compartment air inlet 24 and air outlet 25, respectively, with the used chilled air 38 directed back to the heat exchanger along air circuit 30.

In another present aspect, FIG. 5 is a system diagram showing a system 120 for cooling a galley cart compartment that includes a cool potable water circuit 40 and a chilled air circuit in direct communication with galley cart compartment 20. System 120 shares many of the features of system 110 as shown in FIG. 5, but with system 120 as shown in FIG. 5 comprising an "open" cool potable water circuit.

That is, as explained herein and according to present aspects, an "open" cool potable water circuit is established (and is shown in FIG. 5) when a continuous flow of cool potable water from a cool aircraft potable water supply is directed from the aircraft potable water supply, through a cool potable water circuit and then returns to the aircraft potable water supply for continuous circulation into the potable water circuit from the aircraft potable water supply, as opposed to the cool potable water in the circuit not being allowed to return to the aircraft potable water supply in the "closed" circuit configuration, as shown in FIG. 4, for example). In other words, in the "open" system the cool aircraft potable water supply is at all times within, and is a part of, the cool potable water circuit 40, with the aircraft potable water supply 42 having both a cool potable water supply inlet 42*a* and outlet 42*b* that are both positioned within the cool potable water circuit 40 in the open configuration.

As shown in FIG. 5, cool potable water contained within a cool potable water supply 42 is directed from the aircraft potable water supply 42 via cool potable water supply outlet 42*b* into cool potable water circuit line 43 of cool potable water circuit 40 toward water pump inlet 44*a* of water pump 44, and into pump 44. The cool potable water flow in circuit 40 leaves pump 44 via pump outlet 44*b* toward and into heat exchanger 46 where air in a chilled air circuit 30 is treated as described with respect to FIG. 4.

Similar to the system 110, system 120 in FIG. 5 shows chilled air in a chilled air circuit 30 further chilled by interaction of the air circuit with the cool potable water circuit 40 at the heat exchanger 46. The chilled air within the chilled air circuit 30 directly contacts the galley cart compartment 20, and the cool potable water circuit 40 also directly contacts the galley cart compartment 20. Similar to system 110, system 120 shows the used chilled air 38 leaving the galley cart compartment and directed back to the heat exchanger along air circuit 30.

FIG. 5 shows the warmer water in system 120 cycled within cool potable water circuit 40 and directed back into the cool aircraft potable water supply 42 (in the "open" circuit configuration) via the potable water supply inlet 42*a* and then further directed from the cool aircraft potable water supply 42 via the cool potable water supply outlet 42*b* to and through pump 44 and on to the heat exchanger 46. As the "slightly warmer" cool potable water leaves the galley cart compartment 20, the potable water will begin to chill as the cool potable water circuit that is located beneath the aircraft cabin (and that is exposed to lower ambient temperatures beneath the passenger cabin will begin to chill as the potable water flow proceeds to and from the pump to the heat exchanger, and through the potable water circuit 40 again.

According to further present aspects, further present systems include cooling a galley cart compartment with a cool potable water flow through a cool potable water circuit that is placed in direct contact with the galley cart compartment, with no adjacent or additional chilled air circuit present, and wherein the cool potable water in the cool potable water circuit directed to the cart compartment is exclusively responsible for the cooling of the cart compartment.

According to further present aspects, FIG. 6 is a system diagram showing a system 130 for cooling a galley cart compartment that includes a cool potable water circuit 40 in direct communication with galley cart compartment 20. System 130, as shown in FIG. 6, does not include the presence of a chilled air circuit. That is, according to a present aspect, in system 130, as shown in FIG. 6, the cool potable water in the cool potable water circuit 40 that is directed to the cart compartment is exclusively responsible for the cooling of the cart compartment.

FIG. 6 shows "closed" system 130 including a cool potable water supply outlet 42*b* in communication with pump 44 for the purpose of delivering an initial "charge" of cool potable water to circuit 40 from aircraft potable water supply 42. After the initial "charge" of cool potable water is delivered from the cool aircraft potable water supply 42 to circuit 40, valve 45 of pump 44 is moved to a closed position to close off further entry of cool potable water to the potable water circuit 40 from the aircraft potable water supply 42, and creating the "closed" cool potable water circuit. According to system 130, cool potable water circuit valve line 43 of cool potable water circuit 40 is in communication with pump 44, and a water cooling component 47 (that can be, for example, a water chilling blanket-type device, etc.), with the cool potable water circuit 40 further in communication with the galley cart compartment 20 in a closed circulating system.

As shown in FIG. 6, cool potable water flow within circuit line 43 is directed from pump outlet 44*b* of pump 44 to water cooling component inlet 47*a* of water cooling component 47. The cool potable water flow leaves water cooling component 47 via water cooling component outlet 47*b* and is directed to a galley cart compartment inlet 22 of galley cart compartment 20. The cool potable water circuit 40 of system 130 completes a cycle within cool potable water circuit 40 with slightly warmer (cool) potable water (shown in FIG. 6 as "warmer water") leaving the galley cart compartment 20 via galley cart compartment cool potable water outlet 23. The potable water is directed back to the pump system 44 and directed to proceed through the circuit repeatedly.

As shown in system 130, the potable water can be re-chilled during travel within the potable water circuit 40 at the water cooling component 47 with the water configured to maintain and/or re-establish the cool potable water in circuit 40 at a temperature ranging from about 35° F. to about 50° F. The chilling of the cool potable water in circuit 40 by the water cooling/chilling component 47 is configured to ensure that the temperature delta of the cool potable water flow through potable water circuit 40 remains at a selected temperature range. In addition, as described herein, as the "slightly warmer" cool potable water leaves the galley cart compartment 20, the potable water will begin to chill as the cool potable water circuit that is located beneath the aircraft cabin (and that is exposed to lower ambient temperatures beneath the passenger cabin) will begin to chill as the potable water flow proceeds to and from the pump, and through the closed circuit 40 again in system 130.

According to further present aspects, FIG. 7 is a system diagram showing a system 140 for cooling a galley cart compartment that includes a cool potable water circuit 40 in direct communication with galley cart compartment 20. As shown in FIG. 7 (and similar to system 130 shown in FIG. 6), system 140 does not include the presence of a chilled air circuit. That is, according to a present aspect, in system 140, as shown in FIG. 7, the cool potable water in the cool potable water circuit 40 that is directed to the cart compartment is exclusively responsible for the cooling of the cart compartment, (and is similar to system 130 shown in FIG. 6), with system 140 configured into an "open" cool potable water circuit. That is, system 140 is an "open" system, with the cool potable water supply positioned within and as a part of cool potable water circuit 40 and with the cool aircraft potable water supply 42 continuously providing a source of cool potable water flow into the circuit, and with the cool potable water proceeding through the potable water circuit 40, and then returning to the cool potable water supply 42.

In FIG. 7, system 140 includes many of the components of system 130 (shown in FIG. 6), with the components commonly enumerated. Because system 140 is an "open" circuit with respect to the cool potable water supply, system 140 differs from system 130 (a "closed" system) in terms of the valving of pump 44 and the cool aircraft potable water supply 42 comprising a cool potable water supply inlet 42a (absent from system 130 of FIG. 6) into potable water circuit 40 of system 140 for cooling a galley cart compartment that includes a cool potable water circuit 40 in direct communication with galley cart compartment 20. [Variation 4]-OPEN]

According to another present aspect, FIG. 8 is a system diagram showing a system 150. Unlike systems 110 and 120, system 150 includes a galley cart compartment in direct contact with a chilled air circuit 30, and in indirect contact with a cool potable water circuit 40. That is, in systems 110 and 120 (shown in FIGS. 4 and 5, respectively) both the potable water circuit 40 and the chilled air circuit 30 are in direct contact with the cart to provide cooling to the galley cart compartment.

System 150, as shown in FIG. 8, provides a flow of chilled air directly to the galley cart compartment, with the cool potable water circuit engaging the air circuit at the heat exchanger to augment the chilling of the air in the air circuit 30; but the cool potable water circuit does not directly contact the cart compartment. Instead, according to present aspects, in system 150, the cool potable water circuit indirectly cools the galley cart compartment by providing cooling to the airflow in air circuit 30, with the additionally chilled air in the air circuit then directly contacting the galley cart to cool the galley cart compartment.

As shown in FIG. 8, in system 150, the chilled air circuit is established and proceeds similarly to the air chilled circuit of systems 110, 120, with air directed to heat exchanger intake (referred to equivalently herein as "heat exchanger inlet") of heat exchanger 46 where the cycled air in the air circuit 30 is cooled in the heat exchanger by the cool potable water flow in the potable water circuit 40 that contacts the air circuit in the heat exchanger. The cool air with augmented chilling from the cool potable water circuit at the heat exchanger proceeds from the heat exchanger outlet to air chiller inlet 34a of air chiller 34, leaving air chiller outlet 34b as air chiller conditioned air 36.

According to present aspect, as a result of "pre-chilling" the airflow (e.g., by the cool potable water circuit contacting the airflow at the heat exchanger), the size, weight, power consumption, etc., (e.g., "footprint") of the air chiller incorporated into the air circuit 30 can be significantly smaller than air chillers previously used to chill air used to chill galley cart compartments. In addition, the significantly smaller air chillers called for and that can be used, according to present aspects, further can produce significantly less noise released into, for example, the enclosed environment that is an aircraft passenger cabin and aircraft galley area.

As further shown in FIG. 8, system 150 includes a cool potable water circuit in an "open" configuration, with the cool aircraft potable water supply 42 incorporated within the cool-potable water circuit 40 to provide a continuous and replenishing source of cool potable water to the potable water circuit 40, and with a continuous flow of "used" potable water returning within potable water circuit 40 to the cool aircraft potable water supply 42. As shown in FIG. 8, and according to present system 150, a flow of cool potable water is directed from the cool potable water supply 42 via cool potable water supply outlet 42b along/within cool potable water circuit line 43 to the pump inlet 44a of pump 44, and directed from pump 44 via pump outlet 44b to heat exchanger inlet 46a of heat exchanger 46.

At heat exchanger 46, the air is further chilled or cooled as a result of the cool potable water providing additional cooling to the airflow in the air circuit 30. According to this present aspect, the cooling of the air circuit that is augmented by the "cooling" supplied to the air in the air circuit is considered to provide the "indirect" cooling (by the cool potable water circuit) to the cart compartment directly contacted by the chilled air. As shown in FIG. 8, the system 150 provides air chilled by air chiller 34, with the air chilling augmented by the cooling provided by the cool potable water circuit 40 to the air circuit 30 in the heat exchanger 46.

In each of systems 110, 120, 130, 140, and 150, the potable water circuit can be drained via drainage port 48 that can be located at pump 44, with drainage port 48 in communication with drainage line 48a. During a water circuit drainage operation, selected valving and valve positioning can be implemented to block potable water from entering the water circuit from the potable water supply.

In addition, according to present aspects, in both of the "closed" and "open" systems described herein, the cool potable water circuit 40 can be initially charged with potable water when an aircraft, for example, is on the ground, concurrently with the filling of the cool potable water supply. This can prevent any depletion in aircraft potable water supply for the purpose of operating of the present galley cart cooling systems.

According to present aspects, the temperature of the potable water flow in the potable water circuit can be selected to maintain a temperature range over the circuit that, according to one example, can range from about 32° F. to about 50° F. In another example, the temperature of the potable water flow in the potable water circuit can be selected to maintain a temperature range over the circuit that, according to one example, can range from about 35° F. to about 45° F.

According to present aspects, the temperatures of the potable water in the potable water circuit can be altered to achieve a selected cool or cold temperature range by, for example, varying the degree of insulation used to insulate the potable water circuit and the aircraft potable water supply located below a passenger cabin and subjected to cold ambient temperatures during flight. In addition, selected temperatures of the potable water flow in the circuit can be selected and controlled by providing varied flow velocity provided to the water flow by the pump, and/or by providing, for example, agitation or aeration to the water flow (e.g., by provided surface features to an interior flow through pathway of a circuit line in the water circuit to induce, for example, a selected cavitation, etc.

According to present aspects, the temperature range of the potable water circuit can be primarily selected to provide the cooling to a galley cart compartment to preserve galley cart contents (e.g., food for human consumption) at a storage temperature for a flight duration that is considered to be safe and that will retard the growth of harmful pathogens and/or bacterial growth that can grow exponentially when temperatures are allowed to rise above 45° F. for an extended period, for example.

FIG. 9, is a representative partially exposed view of a heat exchanger 46 of the type that can be incorporated into the circuits and systems described herein, and according to present aspects, with the understanding that pathway and inlet and outlet locations can vary to accommodate selected positioning of circuit lines for selected systems, etc. As shown in FIG. 9, according to present aspects, the cool potable water flow from the cool potable water circuit 40 is introduced at heat exchanger inlet 46a into enters and passes through the heat exchanger 46 and exits the heat exchanger from the heat exchanger outlet 46b at a slightly "warmer" and/or less "cooled" potable water flow/circuit temperature; as the cool potable water flow, within the heat exchanger, encounters an airflow in the heat exchanger at a "warmer" temperature (a temperature that is "warmer" than the cool potable water flow temperature) such that the "warmer" airflow releases heat (and is "cooled" by the potable water flow) with the airflow "cooled", and with the airflow exiting the heat exchanger at a lower, "cooler" temperature. As shown in FIG. 9, the airflow entry into the heat exchanger is represented by the large, shaded arrow entering heat exchanger air inlet 46c, and the "cooler" airflow exit from the heat exchanger at the heat exchanger air outlet 46d represented by the large, unshaded arrow.

If further chilling of the cool potable water is desired, for example, within "closed" systems that can sustain a greater water temperature variation over time, a water chiller that can be, for example, a water-chilled blanket-type device can be integrated into a cool potable water circuit of the systems presented herein to, for example, re-chill the water in the potable water in the circuit with such water chiller positioned, for example, downstream of the heat exchanger, and/or, for example downstream of the cart compartment, etc.

With respect to chilled air circuit 30 shown in FIGS. 4, 5, and 8, and as described herein, the air circuit may not be enclosed in an enclosed physical apparatus or "line", but instead, the air "circuit" represents a directional airflow created in open space that can be directed by fans, etc., and with the arrows shown in the air circuit 30 indicating the directional flow of the air along the "circuit" 30. In other aspects, an airflow can be directed into a physical air line 33.

FIGS. 10, 11, 12, and 13 are flowcharts outlining methods according to present aspects. FIG. 10, is a flowchart outlining a method 200 for cooling an aircraft galley cart compartment, with the method 200 including directing 202 a potable water flow of potable water in an aircraft from an aircraft potable water supply within a potable water circuit, with the potable water flow including a potable water temperature that is below an aircraft cabin ambient temperature. The method 200 further includes positioning 204 the potable water circuit in communication with at least one of a chilled air circuit and an aircraft galley cart compartment to cool an aircraft galley cart compartment at least one of directly or indirectly, and maintaining 206 an aircraft galley cart compartment temperature at a temperature ranging from about 32° F. to about 45° F.

According to a further present aspect, FIG. 11 is a flowchart outlining a method 300 for cooling an aircraft galley cart compartment, with the method 300 including directing 202 a potable water flow of potable water in an aircraft from an aircraft potable water supply within a potable water circuit, with the potable water flow including a potable water temperature that is below an aircraft cabin ambient temperature. The method 300 further includes positioning 204 the potable water circuit in communication with at least one of a chilled air circuit and an aircraft galley cart compartment, and directing 302 chilled air from a chilled air circuit directly to a galley cart compartment to cool an aircraft galley cart compartment, and maintaining 206 an aircraft galley cart compartment temperature at a temperature ranging from about 32° F. to about 45° F.

According to a further present aspect, FIG. 12 is a flowchart outlining a method 400 for cooling an aircraft galley cart compartment, with the method 400 including directing 202 a potable water flow of potable water in an aircraft from an aircraft potable water supply within a potable water circuit, with the potable water flow including a potable water temperature that is below an aircraft cabin ambient temperature. The method 400 further includes positioning 204 the potable water circuit in communication with at least one of a chilled air circuit and an aircraft galley cart compartment. Method 400 further includes directing 302 chilled air from a chilled air circuit directly to a galley cart compartment to cool an aircraft galley cart compartment, directing 402 a cool potable water flow within a cool potable water circuit to an aircraft galley cart compartment, and maintaining 206 an aircraft galley cart compartment temperature at a temperature ranging from about 32° F. to about 45° F.

According to a further present aspect, FIG. 13 is a flowchart outlining a method 500 for cooling an aircraft galley cart compartment, with the method 500 including directing 202 a potable water flow of potable water in an aircraft from an aircraft potable water supply within a potable water circuit, with the potable water flow including a potable water temperature that is below an aircraft cabin ambient temperature. The method 500 further includes positioning 204 the potable water circuit in communication with at least one of a chilled air circuit and an aircraft galley cart compartment. Method 500 further includes directing 402 a cool potable water flow within a cool potable water circuit to an aircraft galley cart compartment, and maintaining 206 an aircraft galley cart compartment temperature at a temperature ranging from about 32° F. to about 45° F.

The methods 200, 300, 400, and 500 as shown in FIGS. 10, 11, 12, and 13 (respectively) can incorporate one or more of the systems 100, 110, 120, 130, 140, and 150 shown in FIGS. 3, 4, 5, 6, 7, and/or 8 (respectively).

The systems, apparatuses, and methods described herein can further incorporate system controllers, sensors, detectors, thermostats, processors, alarms, shutoffs, additional valving, etc., and that can further include attendant processors, hardware and software, etc. to monitor, control, regulate, and/or alter one of more features of the cool potable water circuit and chilled air circuit either manually, automatically, remotely, etc. The addition of controllers, sensors, thermostats, actuators, alarms, "fail safes", etc., to the present systems can be in communication with readouts and/or can be in communication with automated electrical circuits to, for example, monitor and adjust temperatures of the air flow and temperatures of the potable water flow at one or more points along and throughout the air circuit and cool potable water circuit, including the temperature of the potable water supply, such that the air circuit and potable water circuit can be monitored in real time. For example, if a temperature deviation from expected values arises and is detected, the configured and incorporated monitoring devices, and supporting software/hardware/processors can be configured to initiate actions on the water and air circuits to alter airflow and/or potable water flow velocities; change potable water circuit configurations from closed to open systems functioning, etc., for the purpose of, for example, returning a selected temperature range value to optimal operating temperatures, etc. Peripheral sensors, detectors, etc., can further include routine system "checks" on the components of the circuits (e.g., pump performance, system pressure, heat exchange performance, chiller performance, etc.) that can occur at scheduled maintenance intervals as well as occurring at throughout a flight, as a circuit cooling system is initiated, and further including a continuous cooling system monitoring in real time that can include leakage detection as well as temperature variation, etc.

The present aspects may, of course, be carried out in other ways than those specifically set forth herein without departing from essential characteristics of the present disclosure. The present aspects are to be considered in all respects as illustrative and not restrictive, and all changes coming within the meaning and equivalency range of the appended claims are intended to be embraced therein.

What is claimed:

1. A system for cooling an aircraft galley cart compartment, the system comprising:
    a cool potable water flow, said cool potable water flow configured to initiate from an aircraft potable water supply;
    a potable water circuit in communication with the aircraft potable water supply;
    an aircraft galley cart compartment configured to be cooled by a potable water flow circulated through the potable water circuit by at least one of direct cooling and indirect cooling; and
    wherein, in operation, the potable water circuit is a closed potable water circuit, said closed potable water circuit further comprising a valve, said valve positioned between the aircraft potable water supply and the potable water circuit, and wherein said valve is configured to move from an open position to a closed position to maintain a closed initial potable water charge within the closed potable water circuit.

2. The system of claim 1, further comprising:
    a chilled air circuit, wherein at least a portion of the chilled air circuit is in communication with the aircraft galley cart compartment.

3. The system of claim 1, further comprising a heat exchanger in communication with the potable water circuit.

4. The system of claim 1, further comprising a water cooling component in communication with the potable water circuit, wherein said potable water circuit is exclusively responsible for cooling the aircraft galley cart compartment.

5. The system of claim 1 wherein the potable water circuit is in direct contact with the aircraft galley cart compartment, said potable water circuit configured to provide direct cooling from the potable water circuit to the aircraft galley compartment.

6. The system of claim 2, wherein the potable water circuit is in communication with the chilled air circuit, said potable water circuit configured to augment cooling air in the chilled air circuit, said chilled air circuit in direct contact with the aircraft galley cart compartment.

7. The system of claim 2, wherein said potable water circuit is in direct contact with the aircraft galley cart compartment, and said chilled air circuit is in direct contact with the aircraft galley cart compartment.

8. An aircraft comprising the system of claim 1.

9. A method for cooling an aircraft galley cart, the method comprising:
    directing a potable water flow of potable water from an aircraft potable water supply within a potable water circuit in an aircraft, said potable water circuit comprising the potable water flow of potable water at a potable water temperature that is below an aircraft cabin ambient temperature;
    positioning the potable water circuit in communication with at least one of a chilled air circuit and an aircraft galley cart compartment to cool the aircraft galley cart compartment at least one of directly and indirectly;
    maintaining the aircraft galley cart compartment temperature at a temperature ranging from about 32° F. to about 45° F.;
    wherein, in operation, the potable water circuit comprises a closed potable water circuit; and
    wherein the closed potable water circuit further comprises a heat exchanger in communication with the closed potable water circuit, said closed potable water circuit directly contacting the aircraft galley cart compartment.

10. The method of claim 9 wherein the closed potable water circuit further comprises a potable water cooling component, said closed potable water circuit directly contacting the aircraft galley cart compartment.

11. The method of claim 9, wherein the potable water flow of potable water in the potable water circuit maintains an average temperature ranging from about 35° F. to about 77° F.

12. The method of claim 9, further comprising:
    directing chilled air from the chilled air circuit to the aircraft galley cart compartment.

13. The method of claim 9, further comprising:
    directing chilled air from the chilled air circuit to the aircraft galley cart compartment; and
    directing a cool potable water flow from the potable water circuit to the aircraft galley cart compartment.

14. The method of claim 9, further comprising:
    directing a potable water flow from the potable water circuit to the aircraft galley cart compartment; and
    wherein the potable water flow from the potable water circuit is exclusively responsible for cooling the aircraft galley cart compartment.

15. An aircraft galley cart compartment cooled according to the method of claim 9.

16. A method for cooling an aircraft galley cart, the method comprising:
    directing a potable water flow of potable water from an aircraft potable water supply within a potable water circuit in an aircraft, said potable water circuit comprising the potable water flow of potable water at a potable water temperature that is below an aircraft cabin ambient temperature;

positioning the potable water circuit in communication with at least one of a chilled air circuit and an aircraft galley cart compartment to cool the aircraft galley cart compartment at least one of directly and indirectly;

maintaining the aircraft galley cart compartment temperature at a temperature ranging from about 32° F. to about 45° F.;

wherein, in operation, the potable water circuit comprises an open potable water circuit configured to remain in open communication with the aircraft potable water supply; and wherein the open potable water circuit further comprises a heat exchanger in communication with the open potable water circuit, said open potable water circuit directly contacting the aircraft galley cart compartment.

17. The method of claim 16, wherein the open potable water circuit further comprises a water cooling system, said open potable water circuit directly contacting the aircraft galley cart compartment.

18. The method of claim 16, wherein the open potable water circuit further comprises a heat exchanger in communication with the open potable water circuit.

19. The method of claim 16, further comprising:
directing chilled air from the chilled air circuit to the aircraft galley cart compartment.

20. The method of claim 16, further comprising:
directing chilled air from the chilled air circuit to the aircraft galley cart compartment; and
directing a cool potable water flow from the potable water circuit to the aircraft galley cart compartment.

21. The method of claim 16, further comprising:
directing a potable water flow from the potable water circuit to the aircraft galley cart compartment; and
wherein the potable water flow from the potable water circuit is exclusively responsible for cooling the aircraft galley cart compartment.

22. An aircraft galley cart compartment cooled according to the method of claim 16.

* * * * *